Oct. 16, 1934.  C. R. MUELLER  1,976,959
HEATING AND VENTILATING MEANS FOR MOTOR CARS
Filed Feb. 27, 1930
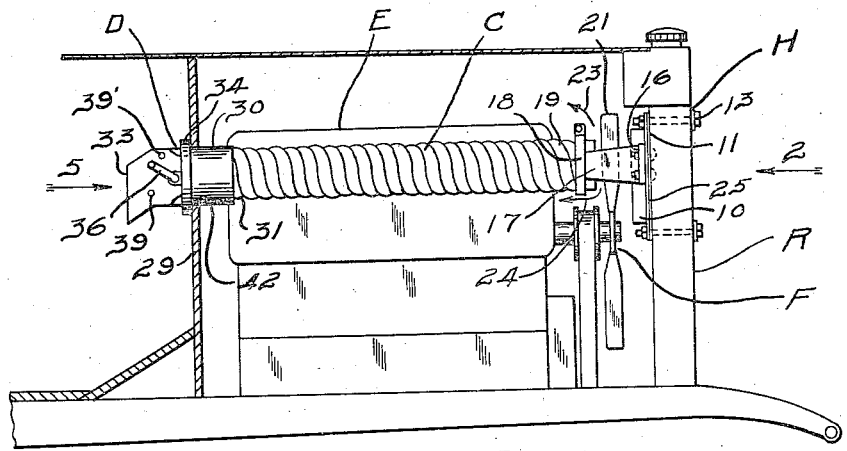
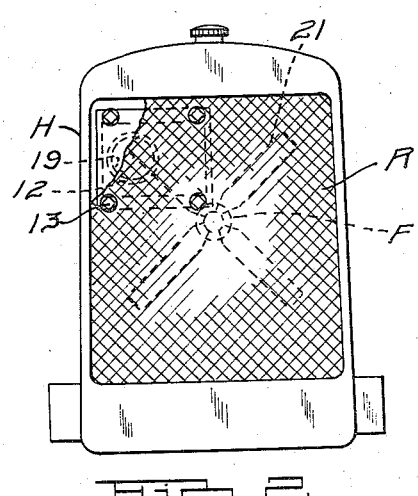
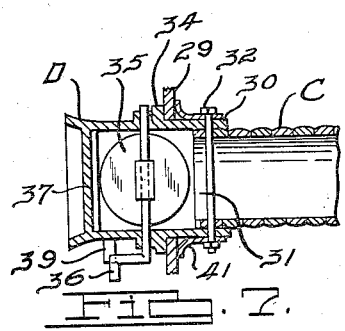
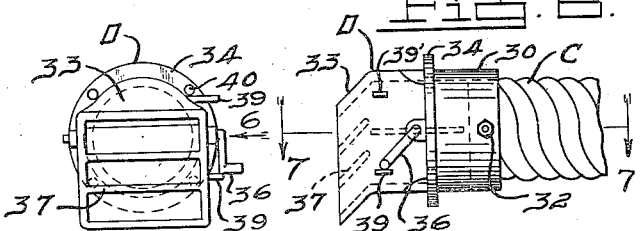
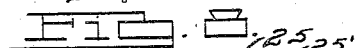
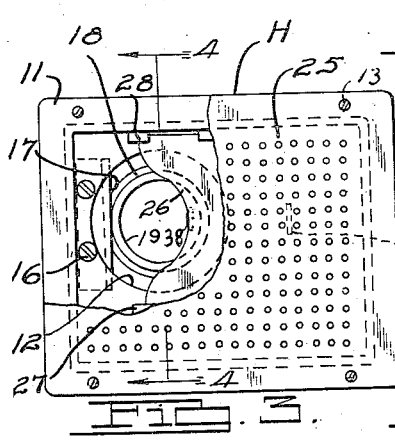
INVENTOR
Christian R. Mueller
BY
Harness, Dickey, Pierce + Hann
ATTORNEYS.

Patented Oct. 16, 1934

1,976,959

UNITED STATES PATENT OFFICE 1,976,959

HEATING AND VENTILATING MEANS FOR MOTOR CARS

Christian R. Mueller, Detroit, Mich.

Application February 27, 1930, Serial No. 431,720

3 Claims. (Cl. 257—241)

This invention provides simple and inexpensive but superior means for utilizing the heat of a part of the fresh air which has passed through any radiator such as is usually provided near the front of an automotive vehicle, in heating the interior thereof.

It is an object of this invention to provide, in connection with a heating or receiving unit for heated air, said unit being preferably supported from the radiator, means for securing the forward or inlet end of a conduit in such a position, relative to the mentioned unit, as to permit the vanes of the usual fan, as driven from the automobile engine, freely to swing, in their usual rotation, past an outlet opening from the heater and the inlet opening to said conduit, thereby advancing pure and suitably warmed air toward said inlet opening in large volume and preferably overflowing the same in such manner as to maintain a positive pressure within the car and obviate any admission of foul air thereto.

It is a further object of this invention to provide means, preferably subject to manual or other adjustment, for retarding or limiting the advance of air through said heater in such manner as to vary or control the temperature imparted; and preferred embodiments of the air-receiving heater unit, adapted to be secured to the inner face of a radiator by mere bolts extending therethrough, may include not only a rearwardly depressed or concave and flanged "pan", a foraminous element being optionally interposed between said pan and a radiator, but also a bracket secured to the rear face of said pan adjacent an aperture therein and serving to support the forward end of the mentioned conduit in suitably spaced relationship thereto,—an outlet from said pan, opposite the inlet to said conduit, being of such size and position as to assure the mentioned delivery of heated pure air into said conduit substantially without a mixture of impure air from under the engine hood.

Another object of this invention is to provide, for use in connection with said heater or independently thereof, a special air delivery device suitable for connection with the inner end of the mentioned conduit and adapted to be supported from a dash or other partition or wall of a car body in such a manner as to favorably deliver the stream of air advanced through said conduit into a car; and said delivery device may include not only means for engagement of the mentioned partition and conduit but also deflectors, said deflectors being preferably integral with the delivery device and positioned to deflect the air delivered therefrom, damper means is also provided for regulating the rate of advance of the delivered air or closing it off entirely.

Other objects of the present invention, including the optional use of an extensible and contractile flexible tube as the mentioned conduit between said heating device and said delivery device, may be best appreciated from the following description of an illustrative embodiment of the said invention, taken in connection with the appended claims and the accompanying drawing, in which Fig. 1 is a side view of the engine of an automotive vehicle with the conventionally associated dash, hood and radiator shown therewith, certain parts being shown in cross section to illustrate certain details more clearly.

Fig. 2 is a front elevational view, taken substantially as indicated by the arrow 2 of Fig. 1, showing one favorable position and mode of attachment of the air heating and receiving unit.

Fig. 3 is an enlarged elevational view, corresponding to the upper left hand portion of Fig. 2 but with the radiator omitted and parts broken away.

Fig. 4 is a vertical sectional view, taken substantially as indicated by the line 4—4 of Fig. 3.

Fig. 5 is a rear or end elevational view of a delivery unit including a diffuser, this view being taken substantially as indicated by the arrow 5 of Fig. 1.

Fig. 6 is a side elevational view, taken substantially as indicated by the arrow 6 of Fig. 5.

Fig. 7 is a horizontal sectional view, taken substantially as indicated by the line 7—7 of Fig. 6; and Fig. 8 is an elevational view of a modified form of the receiving plate unit one form of which is illustrated in Fig. 3, parts being broken away to illustrate certain details more clearly.

As will be immediately appreciated upon inspection of Fig. 1, the illustrated form of the present invention includes, beneath a hood which protects an engine E, a conduit C extending substantially parallel therewith; an air-receiving heater unit H secured to a radiator R and spaced from the forward end of the conduit C; and also a so-called diffuser unit D, at the rear or inner end of said conduit, the forward end of the conduit C being spaced from the unit H to permit the blades of the fan F to rotate between the forward end of the conduit C and the unit H.

Referring first to details of the illustrated heater unit H, one advantageous position thereof being clearly indicated in Figs. 1 and 2, details of its preferred construction are shown in Figs. 3 and 4 as including an air chamber in the form of a pan 10, this being provided with a flange 11 and with an outlet opening 12, the pan 10 being secured to the rear surface of the radiator R by bolts 13. Means such as a bracket 15, shown as secured to the pan 10 by bolts 16 and as including a rearwardly extending web 17 and a split collar 18, may be employed to secure an inlet end 19 of the conduit C in a desired spaced relationship to the pan 10.

In order to permit reliance upon any usual fan F, as commonly provided to assure a desired advance of cooling air through a radiator R (see Fig. 4), the heating unit H is so positioned that the mentioned outlet opening 12 and the inlet opening to conduit C are entirely or mainly within the radius of the vanes or blades 21 of the fan F; and the length of the web 17 of the bracket 15 and the position of the collar 18 upon the inlet end of the conduit C are intended to be such as merely to afford a safe working clearance for said fan blades, the result being that suitably heated fresh air is not only advanced into said conduit, as indicated by an arrow 22, but is also caused to overflow the same and to advance externally thereof, that is, a part of the air which does not enter the conduit C will spill over the sides of the forward open end of the conduit C and flow rearwardly over the outer surface of the conduit C, substantially as indicated by the arrows 23 and 24 and in such manner as normally to obviate risk of any admission of foul air to said conduit or to the interior of the car.

As a means of predetermining the heating effect obtained by the described construction, means such as a foraminous plate 25, shown as retained between the mentioned flanges 11 and the radiator R, and a slidably adjustable plate 26 is retained in position by means of lugs 27 and 28 which are struck inwardly from the rear portion of the pan 10 may be employed, and the use of a material such as a resiliently contractile type of flexible tubing for the conduit C may serve not only to obviate the necessity for exact alignment or other careful positioning of the delivery unit D, relatively to the heating unit H, but also to aid in the retention of the mentioned parts in their assembled relationship by drawing an outwardly extending collar 34 which is provided on the outward rear portion of the delivery unit D, into engagement with a dash or other partition 29.

Coming now to details of the preferred construction of the delivery unit D, this is shown as comprising a substantially cylindrical portion 30, adapted to receive the rear end 31 of the conduit C (with which it may be connected by means such as a bolt 32) and also a substantially rectangular and downwardly inclined portion 33, a collar 34 may be formed on the outer periphery of the delivery unit between the cylindrical portion 30 and the downwardly inclined portion 33, the downwardly inclined portion being preferably provided not only with a damper 35, manipulable by a handle 36, but also with a plurality of downwardly inclined and integral or other deflectors or baffles 37.

It will be understood that the provision of cooperating flow control means comprising the damper 35, the apertured plate 25 and the slidable plate 26 of the respective units D and H permits the rate of flow of fresh air to the car to be controlled independently of the heating thereof; but that such details as the provision of a rearwardly extending thumb piece 38 upon the plate 26, if the latter is used at all, or the spacing and exact angular position of the diffusing or deflecting elements 37, or the positioning of stops 39, 39' for the damper handle 36, or the employment of bolts or screws 40 or resilient fingers 41 (shown as retained by bolt 32) in holding, or helping to hold, the collar 34 in engagement with any supporting partition 29, are of relatively subordinate importance as compared with features previously mentioned. The extensibility and resiliency of the flexible tubing used as conduit C will, however, be seen to facilitate installation of a standardized organization of the described character in any one of a great variety of cars; to permit a misalignment of parts; and also, in case the conduit is stretched in installation, to contribute to the retention of the collar 34 against the partition 29. No cutting operation other than the provision of a suitable opening at 42, in said partition, is required; and all mentioned parts are naturally intended to so inter-fit as to obviate rattling.

When produced in quantity for use under specified conditions, the mentioned parts will naturally be further standardized for the intended specific use; and an exit for dust from pan 10 may be provided, as by an outlet at 43; but it is intended that the delivery of fresh and moderately warmed air through the unit D shall be such as to obviate, by creating slight positive pressure within the car, all danger of admission of combustion gases, or of gases laden with odors such as arise from the heating of lubricating oils, to the car. It will be obvious that, in case any part of the radiator is "blocked off" in cold weather, no obstruction should be placed in front of the heating unit H; and it is suggested that, for a ventilating effect, the damper 36 be kept wide open unless the car becomes too warm. As to adaptation to warm weather, it is suggested that if reliance upon partial dismantling is preferred to a reliance upon readjustment, only the conduit C, or said conduit and said heating unit, be removed; but the retention of all parts in place, the damper being closed, may ordinarily be preferred.

In applicant's present invention, the positioning of the front end of the conduit in spaced relation from the heating unit with the fan disposed to revolve between the heating unit and the front end of the conduit, provides a heating device in which air will be pumped by the fan into the conduit by which it is conducted to the vehicle body, whenever the engine is operating regardless of whether the automotive vehicle be moving or standing still. In this connection, it should perhaps be further emphasized that although the temperature imparted to the air depends upon several factors, the rate of its flow through the radiator may depend upon the size and distribution of the openings in the plate 25 or in the plates 25, 25', Fig. 8. It is not necessary that the openings in plate or plates 25 be so spaced as to come opposite the respective tubes or passages through the radiator, because an increase in heating effect may be obtained, within limits, by any means tending to prolong the exposure of the air to the heat of the radiator; and any one of a plurality of plates 25, having different size openings spaced farther apart or closer together as may be desired or a pair of apertured and slidably related plates 25, 25' may accordingly be used,—the latter construction being suggested in Fig. 8.

The indicated preference for a rearward position of the plate or plates 25 should not be understood to preclude use of a plate disposed in front of the radiator or the use of a so-called "louvre" or "shutter" front; nor should it be supposed that the showing of fixed attachment bolts 13 as extending through plates 25, 25' need preclude a relative adjustment of said plates, or of any suitable shutter or louvre elements, by thermostatic or other remote-control means of any usual or preferred type; but it is not recommended that the pan 10 be eliminated unless the blades 21 of fan F be caused to work much closer to the radiator than has heretofore been customary,—only a safe working clearance being left therebetween; and, in such case, the forward end of the conduit 19 should be advanced accordingly,—in order that the air delivery from the fan may be utilized as effectively as possible. As indicated, the fan blades are intended always to pass within efficient suction range of a heated surface and to pass the entrance to a conduit leading directly into a car,—said entrance being not only substantially within the radius of the fan but within the efficient discharge range thereof; and the axis of the front end of the conduit need not be parallel with the axis of the fan, but should be parallel with the streamlines from the fan.

In conclusion, applicant places emphasis upon not only the described details of support, interconnection, spacing, internal construction and adjustable control, but also upon the fact that the relative sizes, the spacing and the substantially concentric positions of the openings through which air is inwardly advanced from the air chamber of the heating unit into the conduit C are intended to be such as to assure the creation of a positive pressure of fresh air, by any usual fan F, not only within but around the entrance to said conduit,—thus excluding undesired gases, as above mentioned. Relying upon principles which have heretofore been utilized in heating dwellings and the like, it will be seen that applicant's device serves to force a large volume of warm air, rather than a small volume of very hot air, into the car; and that the described organization may accordingly be broadly referred to as providing means whereby an unenclosed radiator fan is rendered effective to advance through the radiator and into a conduit that is supported between said radiator and a partition or wall element of the car body, exclusively fresh air.

Although the foregoing description has included complete details of but one embodiment of the present invention, it should be understood not only that various features thereof might be independently employed but also that numerous modifications, additional to any suggested herein, might easily be devised by workers informed of the foregoing,—all without departure from the scope of the invention as indicated in the following claims.

I claim:

1. A heating and ventilating apparatus for an automotive vehicle comprising a water cooling radiator and a revolving fan positioned at the rear thereof and adapted to draw air therethrough, an air accumulating receptacle secured to the rear of said radiator having a restricted outlet positioned forwardly of and within the radius of said fan for receiving and slightly compressing heated air passing out of said radiator, an air conduit leading from the passenger compartment of said vehicle through the engine hood to a point rearwardly spaced from the outlet of said air accumulating receptacle and to the rear of said fan, said accumulator outlet being positioned to discharge a jet of relatively slightly compressed air directly toward the end of said air conduit across the path of said revolving fan whereby said fan is utilized to accelerate the passage of said air jet through said conduit to said passenger compartment.

2. A heating and ventilating apparatus for an automotive vehicle comprising a water cooling radiator and a revolving fan positioned at the rear thereof and adapted to draw air therethrough, an air accumulating receptacle secured to the rear of said radiator having a restricted outlet positioned forwardly of and within the radius of said fan for receiving and slightly compressing heated air passing out of said radiator, an air conduit leading from the passenger compartment of said vehicle through the engine hood to a point rearwardly spaced from the outlet of said air accumulating receptacle and to the rear of said fan, said accumulator outlet being positioned to discharge a jet of relatively slightly compressed air directly toward the end of said air conduit across the path of said revolving fan whereby said fan is utilized to accelerate the passage of said air jet through said conduit to said passenger compartment, and said accumulator outlet being adapted to discharge a jet of relatively slightly compressed air of greater volume than said conduit end is adapted to receive whereby the volume of said jet of air will overflow the end of said conduit and exclude therefrom undesirable vapors or air within said engine hood.

3. A heating and ventilating apparatus for an automotive vehicle, comprising a water cooling radiator, means for conducting heated air from the rear of said radiator to the part of said vehicle to be heated, including an air accumulating receptacle secured to the rear of said radiator and an air flow controlling screen interposed between said radiator and said air accumulating receptacle.

CHRISTIAN R. MUELLER.